United States Patent [19]
Murray

[11] Patent Number: 5,553,205
[45] Date of Patent: Sep. 3, 1996

[54] SYSTEM AND METHOD OF TRANSFERRING A BIT-MAPPED IMAGE USING RASTER COLUMNS

[75] Inventor: Ronald C. Murray, Redmond, Wash.

[73] Assignee: Microsoft Corporation, Redmond, Wash.

[21] Appl. No.: 540,898

[22] Filed: Oct. 11, 1995

Related U.S. Application Data

[63] Continuation of Ser. No. 870,932, Apr. 20, 1992, abandoned.

[51] Int. Cl.⁶ ................................................ G06K 15/00
[52] U.S. Cl. ............................................ 395/117; 400/64
[58] Field of Search ........................... 395/103, 105, 395/108, 114, 117; 400/53, 61, 76, 82, 323, 63, 64, 62

[56] References Cited

U.S. PATENT DOCUMENTS

| | | | |
|---|---|---|---|
| 4,207,011 | 6/1980 | Pascoe | 395/117 |
| 4,929,099 | 5/1990 | Graham et al. | 400/61 |
| 4,963,894 | 10/1990 | Lebeau et al. | 346/107 R |
| 4,998,832 | 3/1991 | Okimoto et al. | 400/76 |
| 5,047,956 | 9/1991 | Hirami et al. | 395/117 |
| 5,052,835 | 10/1991 | Takahashi | 395/117 |

*Primary Examiner*—Arthur G. Evans
*Attorney, Agent, or Firm*—Seed and Berry, LLP

[57] ABSTRACT

A system and method of transferring digital information corresponding to a bit-mapped image from a first device, such as a computer, to a suitable receiving device, such as a printer with adjustable margins. Raster columns within the bit-mapped image are recognized, the margins of the raster columns are defined, the margins of the receiving device are adjusted so that a single raster column is defined within the margins, and data comprising the raster column is sent to the receiving device in a manner that utilizes the automatic cursor reset capability of the receiving device. The raster columns are identified by scanning the bit-mapped image to identify columns of data separated by column-wise areas without HIGH data values.

14 Claims, 5 Drawing Sheets

SYSTEM AND METHOD OF TRANSFERRING A BIT-MAPPED IMAGE USING RASTER COLUMNS

CROSS-REFERENCE TO RELATED APPLICATION

This application is a continuation of U.S. patent application Ser. No. 07/870,932, filed Apr. 20, 1992, now abandoned.

TECHNICAL FIELD

This invention relates to a method of increasing the rate of transfer of bit-mapped images between devices, such as from a computer to a printer, by reorganizing data columns in the bit-mapped image by setting adjustable margins to bracket the data columns, and by sending data within the data column to the printer.

BACKGROUND OF THE INVENTION

Many printers use an imaging scheme in which the image to be printed is represented as an array of individual image points called "pels" (short for "picture element"). A typical laser printer can print an image with a resolution of about 300 pels per inch. On such a printer, an 8-inch by 10-inch image would consist of a set of 7,200,000 pels. In the simplest case where pels are restricted to two values—black and white—such an image could be represented by a set of 900,000 eight-bit bytes. Thus, an equivalency exists between an image to be reproduced and a set of digital values. The digital values which represent an image, and the image produced from a set of digital values, are referred to interchangeably herein as a bit-mapped image. Color images, being somewhat more complex than black and white images, require a larger number of bytes to define. For simplicity, only black-and-white bit-mapped images will be discussed herein. However, the preferred embodiments described herein can easily be modified for use with color bit-mapped images.

To print a bit-mapped image stored in a computer memory, that image must first be transferred from the computer to the printer along a printer interface. Personal computers use either a serial or a parallel printer interface. Serial connections typically can transfer data at a rate of about 1920 bytes/second while parallel connections are usually 5 to 10 times faster. Ignoring any overhead in the printer's command language, a full-page bit-mapped image transferred along a serial connection might require about 470 seconds; a parallel connection might require about 95 seconds. Since many printers can print a full page within 10 seconds after they receive the bit-mapped image, the data transfer represents a significant bottleneck.

Typical printers used with personal computers are usually raster-style printers which print according to a predetermined scan pattern. While scan patterns will vary from printer to printer, it will be assumed herein that scanning is performed left-to-right along a horizontal row, and then left to right one, row down, and so on. The current print position is referred to herein as the cursor position, or simply as the cursor.

To print an image on a raster printer three pieces of information may be required: (1) the pel image data at each pel location; (2) the page coordinates for each pel; and (3) the direction in which the cursor is to move to the next pel. The pel image data is always required since it informs the printer what is to be printed at each pel. However, the page coordinates for each pel and the cursor movement direction usually need not be specifically transmitted since the cursor movement direction follows the printer scan pattern and the current page coordinate is usually kept internally by the printer during printing. When printing, the printer prints a pel, moves to the next pel position according to the scan pattern, internally updates the cursor position, associates the updated cursor position with pel image data for that location, and prints that pel. This process continues until the cursor sweeps as far to the right as permitted, or when a new row is command by the computer, the cursor automatically resets to the far left position, called the left margin, one vertical row down. Thus, only the initial page coordinate usually must be sent to the printer to synchronize the starting cursor position with the pel image data. In some modern printers the left and right margins are not fixed, but rather the margins may be adjusted using software commands. These adjustable margins permit the computer to control columnwise where printing is to occur. Printers with adjustable margins typically will also automatically reset the cursor to the left margin, one row down, when the cursor reaches the right margin.

It frequently occurs when printing bit-mapped images that large column-wise sections of the image, hereinafter call gaps, do not contain HIGH data values. A typical gap is illustrated by the blank column 2 in the bit-mapped image 4 of FIG. 1. One possible method of optimizing the sending of the bit-mapped image to the printer is for the computer to send cursor movement commands which cause the cursor to jump over the blank column 2 when the cursor reaches the left edge 6 of the blank column. These cursor movement commands involve the sending of data from the computer to the printer to inform the printer when and how far to move the cursor. Such commands would preferably not be used when the amount of data corresponding to the gap is less than the data stream required to cause the cursor to jump. This jumping process is illustrated in FIG. 1 by a movement arrow 8 that indicates cursor movement. Since row one 10 has no gap, the cursor moves pel-by-pel until it reaches the right margin 12, at which time the cursor automatically resets to the left margin 14, one row down. While printing row two 16, the cursor eventually encounters the blank column 2. The computer then transmits to the printer a movement command which causes the cursor to jump the blank column, as shown by the hump 18 traced by the movement arrow 8. After jumping the blank column 2 the cursor continues printing until the right margin 12 is again reached, at which time the cursor automatically returns to the left margin 14, one row down. When printing the third row 20, the computer again causes the cursor to jump the blank column. This process continues until the bit-mapped image has been completely printed.

While the above printing scheme is generally successful, some bit-mapped images are comprised of numerous irregular blank columns which separate column-wise portions of the bit-mapped image, called herein raster columns, which have had to be sent bit-by-bit. According to the above-described method of transferring data within the raster columns, many cursor movement commands would be required due to the irregularity of the blank columns. Therefore, it would be beneficial to have a method of sending raster columns from a computer to a printer without using cursor movement commands to jump intervening blank columns.

SUMMARY OF THE INVENTION

It is an object of the present invention to provide a system for transferring raster columns in a bit-mapped image from a sending device to a receiving device.

It is another object of the present invention to provide a method of transferring portions of a bit-mapped image to a printer in a column-wise manner.

It is another object of the present invention to reduce the amount of data required to send a bit-mapped image to a device having adjustable margins.

It is yet another object of the present invention to reduce the amount of data required to send a bit-mapped image in a computer to a printer having adjustable margins.

These and other objects of the present invention which will be apparent to those skilled in the art as a preferred embodiment of the invention is described more fully below, and are obtained in a method and system for transferring digital information corresponding to a bit-mapped image from a sending device to a receiving device in accordance with the present invention. In a preferred embodiment, data is sent from a computer to a printer having adjustable margins and a cursor which automatically resets to one margin when the cursor reaches the other margin. The preferred embodiment described herein includes the steps of recognizing raster columns within the bit-mapped image, adjusting the margins of the receiving device so that data comprising a single raster column is contained within the margins, and sending the data within the raster column to the receiving device. In one embodiment, after the data within a raster column is sent to the receiving device, the margins are set to border the next raster column.

The system includes a means for recognizing raster columns within the bit-mapped image, a means for generating and sending commands to a printer to cause the printer to adjust its margins so that data comprising a single raster column is contained within the margins, and a means for sending the data within the raster column to the receiving device.

DETAILED DESCRIPTION OF THE INVENTION

The present invention relates to a method for sending a bit-mapped image having raster columns from a first device, such as a computer, to a second device, such as some printers, having adjustable margins and a cursor that is automatically reset when the cursor reaches one margin. For simplicity it will be assumed that the cursor is automatically reset to an adjustable left margin, one vertical row down, when the cursor reaches an adjustable right margin.

The inventive method includes the steps of recognizing raster columns within the bit-mapped image, determining appropriate margins for the raster column so that the raster column is contained within the margins, adjusting the margins of the receiving device to correspond to the determined appropriate margins, and transmitting the bit-mapped image data within the raster column to the receiving device while utilizing the automatic reset capability of the receiving device.

Figure 1:
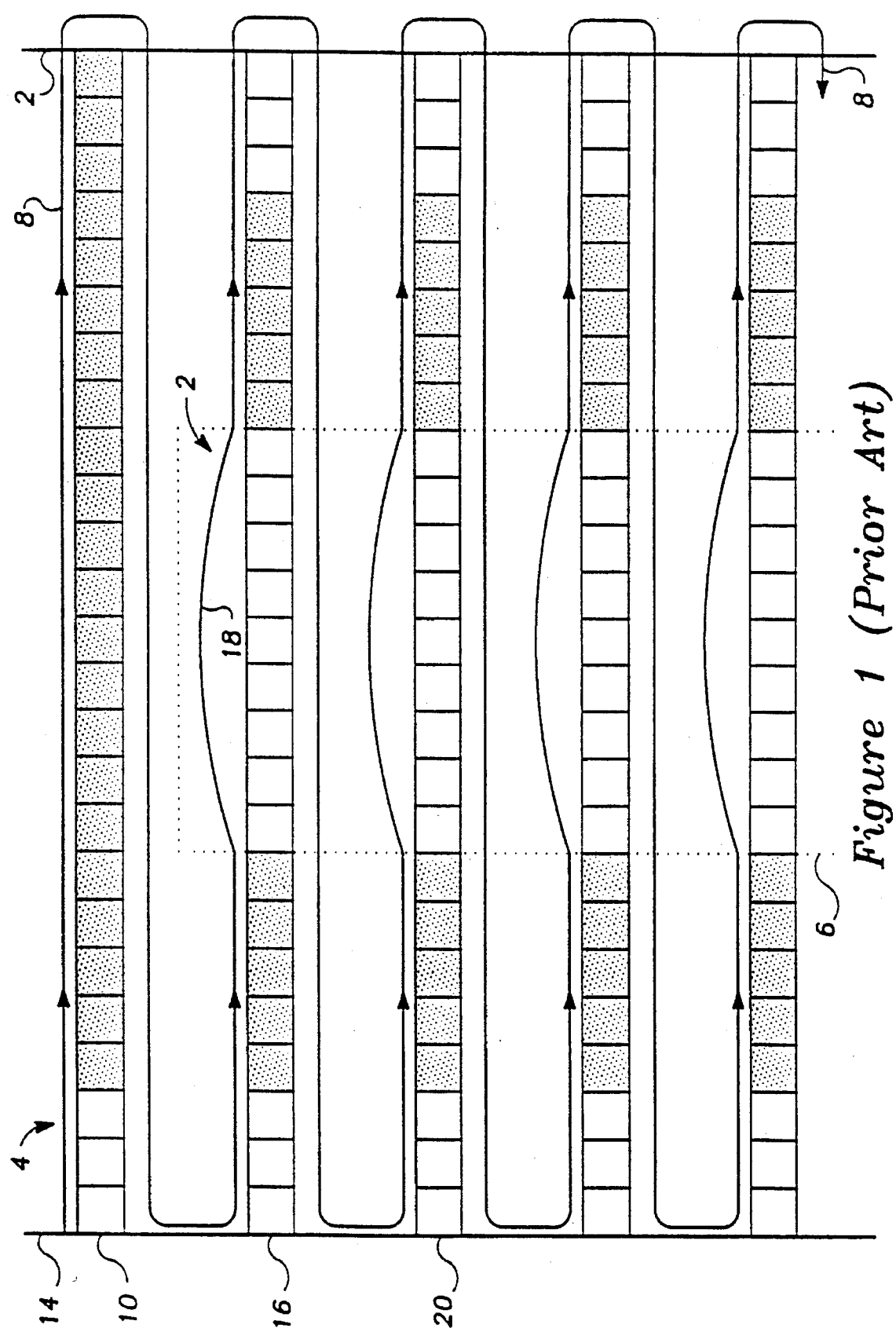
FIG. 1 is an illustration of a bit-mapped image having a gap and the manner in which a prior art system would typically send the bit-mapped image to a receiving device.
Figure 2:
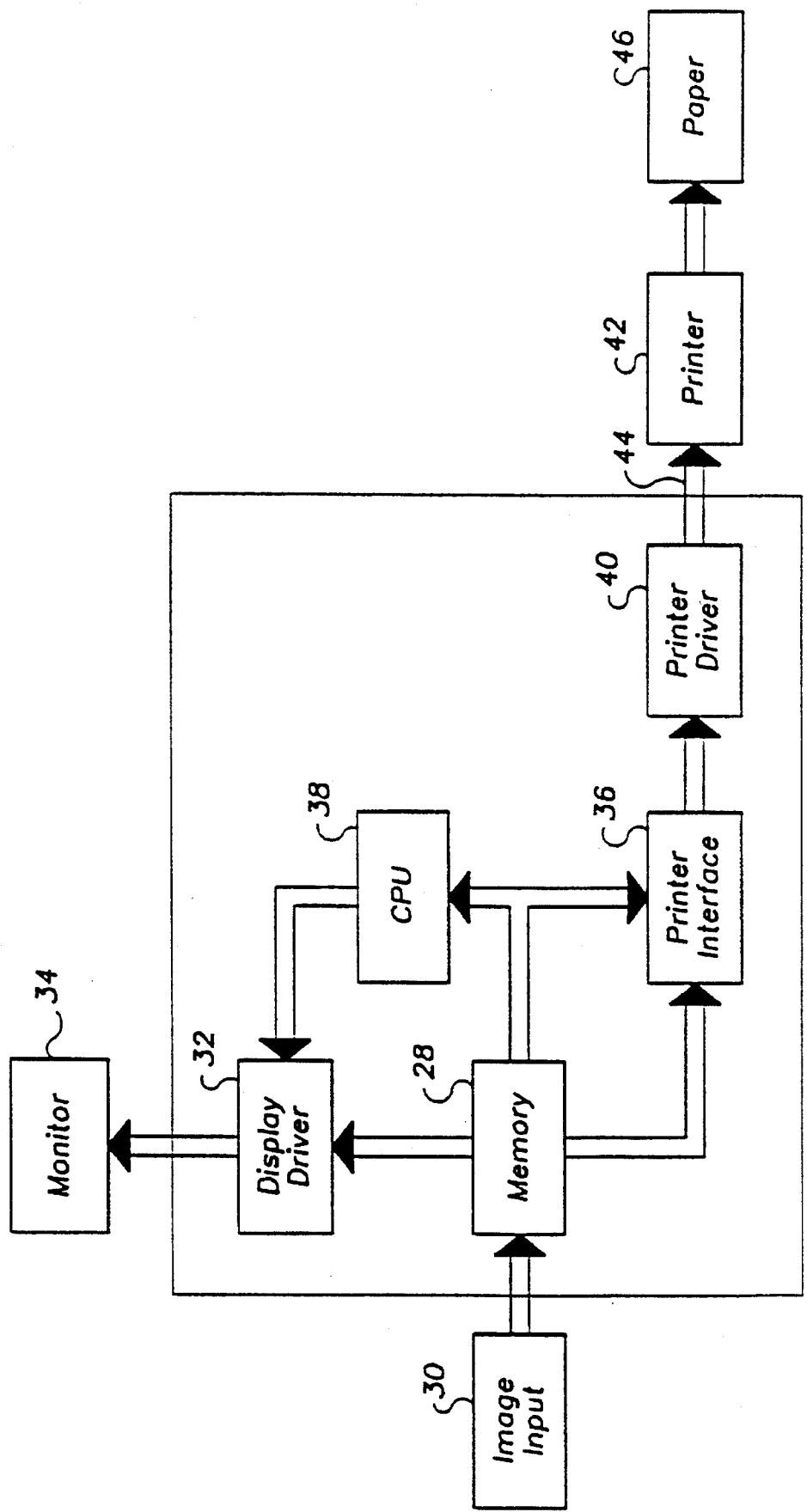
FIG. 2 is a block diagram illustrating a computer-printer system comprising a preferred embodiment of the present invention.

A computer-printer system 24 comprising a preferred embodiment of the present invention is illustrated in block diagram form in FIG. 2. A computer 26, such as a personal computer, includes a memory 28 which stores digital values corresponding to a bit-mapped image. The bit-mapped image may have been created by application software, may be from a digitizer, or may have been received from another device, represented in FIG. 2 by image input 30. The bit-mapped image in memory 28 may be applied to a display driver 32 which causes the image to be displayed on a monitor 34 for viewing by an operator. The bit-mapped image is also applied to a printer interface 36 which creates a working copy of the bit-mapped image and which processes the image data (1) to identify raster columns within the bit-mapped image, and (2) to identify appropriate margins for those raster columns. When directed by a central processing unit 38, under the control of a software program (not shown), the printer interface sends commands to a printer driver 40 appropriate to cause a suitable printer 42 to set its margins to the identified margins. The printer driver 40 then sends, via an interface 44, the margin adjust commands which cause the printer 42 to so adjust its margins. The printer interface then sends the bit-mapped image data within a first raster column to the printer, via the printer driver, utilizing the automatic cursor reset capability of the printer. After all of the bit-mapped image data within the first raster column has been sent to the printer, the printer interface causes the left and right margins to be adjusted so that the next raster column is between the margins. The process repeats until all raster columns have been sent to the printer. The bit-mapped image data is received by printer 42, which stores the bit-mapped image data until the image is to be printed at which time the printer prints the image on paper 46, or other suitable medium.

Figure 3:
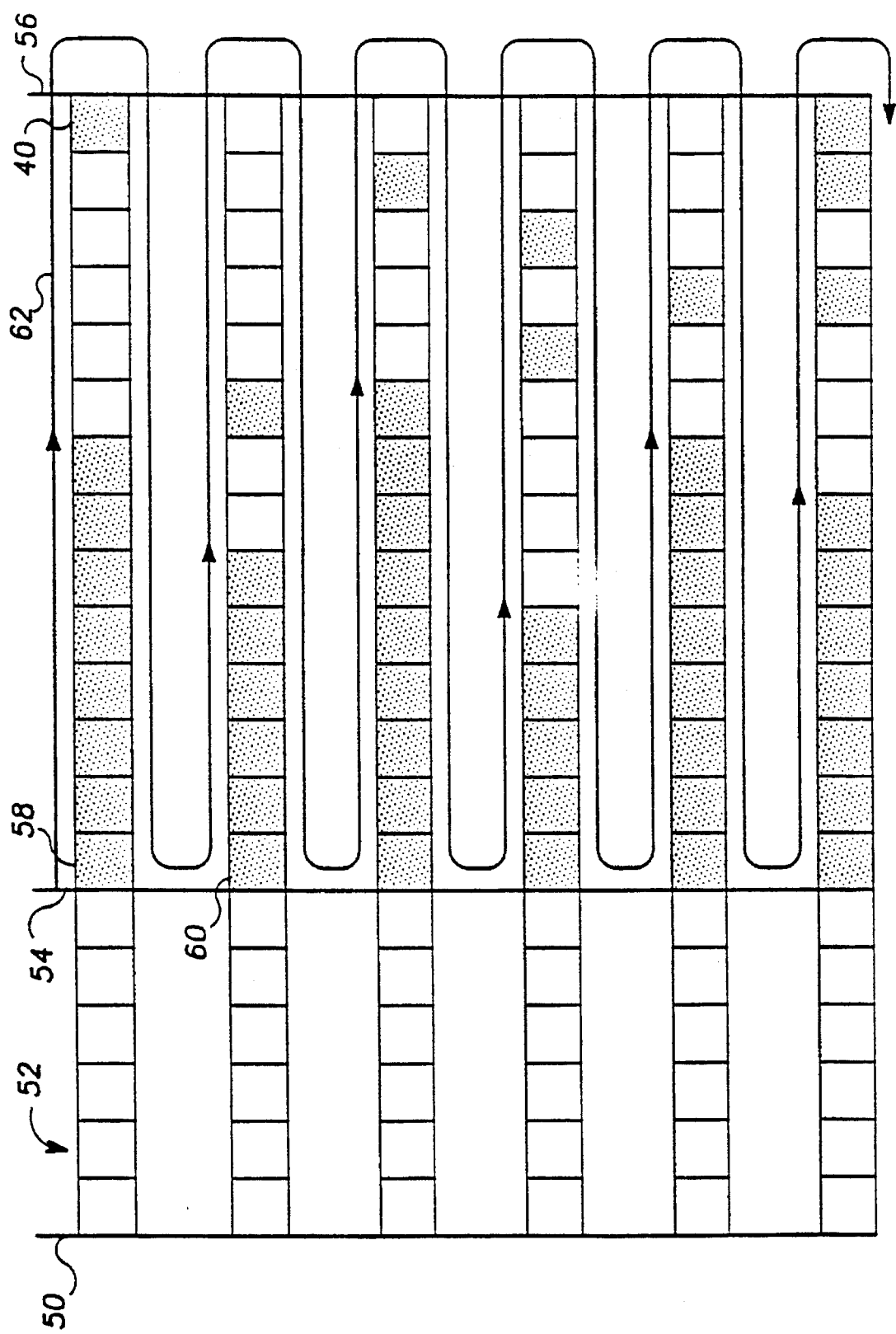
FIG. 3 illustrates a simple bit-mapped image and the resulting cursor movement when sending the bit-mapped image to a printer according to a preferred embodiment of the present invention.

In the preferred embodiment described herein, the data stream required to send the bit-mapped image to the printer 42 is reduced by sending all image data in a data raster column prior to sending data in other columns and by bypassing gaps in the bit-mapped image. Preferably data in a raster column is sent using the printer's automatic cursor reset capability. The basic process of using adjustable margins is explained with the assistance of FIG. 3, an illustration of a bit-mapped image without data near the left edge 50 of the bit-map. Individual squares in FIG. 3 represent pels within the bit-mapped image. Pels are shaded to represent HIGH data values and left blank to represent LOW data values. It is to be understood that FIG. 3 shows a highly simplified bit-mapped image, and that an actual bit-mapped image may be thousands of bits wide. It is also to understood that a raster column need not be a solid block of HIGH data values, but rather it is a set of data values definable within a column through the bit-mapped image. All raster columns must have at least one identifiable "edge" which borders a "large" gap without HIGH image data values. With reference to FIG. 3, a gap 52 extends from the left edge 50 to an adjusted left margin 54, which identifies the left edge of the raster column. Additionally, it is assumed that FIG. 3 has only one raster column which extends to the far right margin 56 set at the right edge of the bit-mapped image. Before the computer begins sending image data to the printer, the computer adjusts the cursor position to the starting print position, pel 58. The computer then begins sending image data to the printer pel-by-pel until the far right margin 56 is reached, at which time the cursor position automatically resets to the left margin 54, one row down. This position is referred to as position 60. The cursor movement is illustrated by the movement arrow 62. It is to be understood that the cursor automatically moves to position 60. The computer then continues sending data in a continuous bit stream as shown by movement arrow 62 until all data in the raster column has been sent to the printer. For the simple bit-mapped image shown in FIG. 3, this process results in a fast image transfer output without movement commands.

Figure 4:
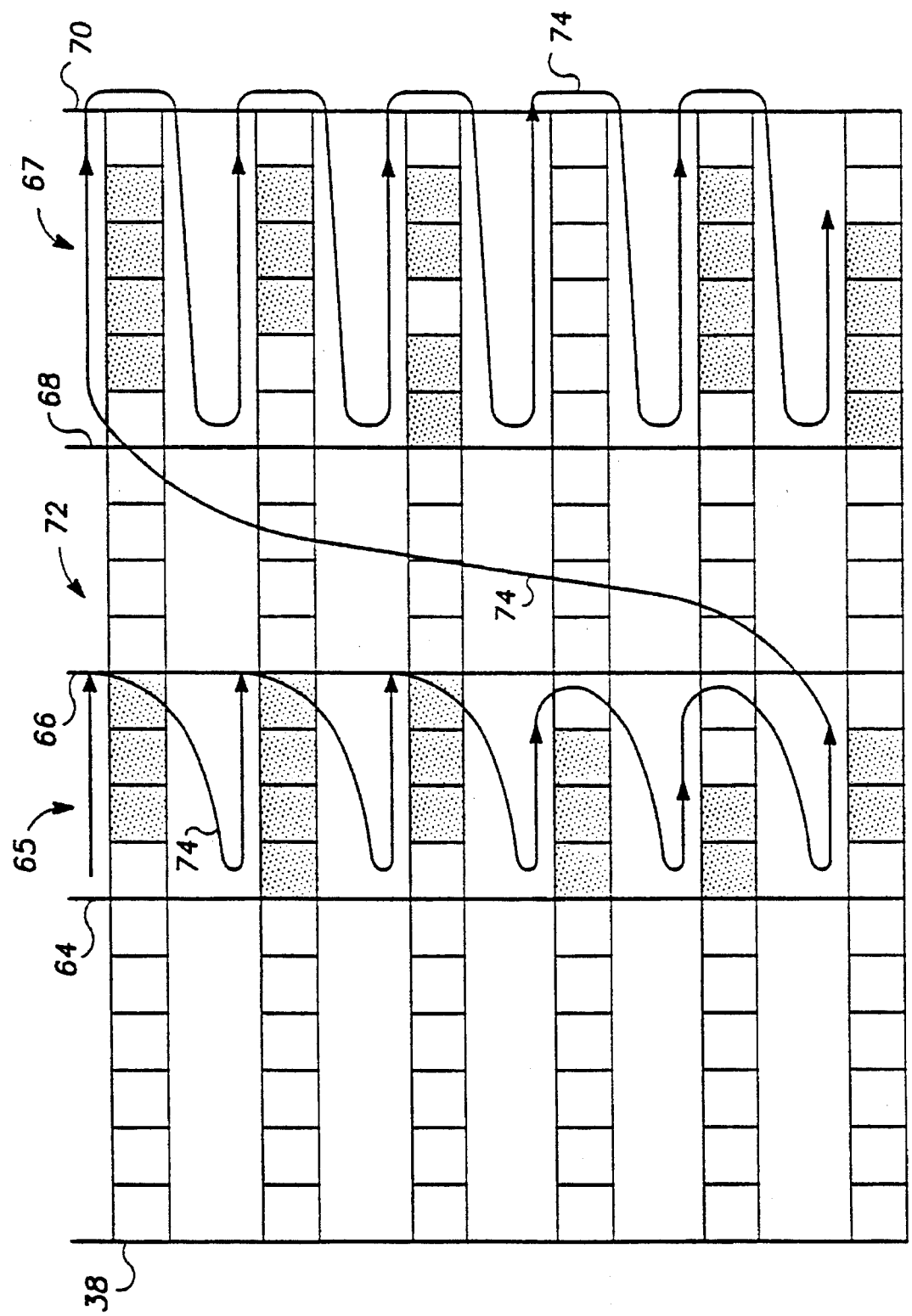
FIG. 4 illustrates the cursor movement when sending a bit-mapped image comprised of two raster columns separated by a large gap when practicing a preferred embodiment of the present invention.

The above method can be improved by adjusting both the printer's left and right margins when the bit-mapped image includes a gap separating raster columns. Such a bit-mapped image is shown in FIG. 4, wherein the bit-mapped image contains two raster columns 65, 67, one located between a first left margin 64 and a first right margin 66, and the other located between a second left margin 68 and a far right margin 70. The gap 72 separating the two raster columns is denoted by an absence of HIGH data values, and extends from the first right margin 66 to the second left margin 68. In practice, hundreds of separate raster columns may exist in a bit-mapped image. Two raster columns are shown here to simplify illustration.

A preferred strategy for sending a bit-mapped image such as that shown in FIG. 4 is to send all of the image data in a single raster column to the printer by utilizing the automatic cursor reset capability and adjustable margins of the printer before sending any image data in the other raster columns. After one raster column has been sent the cursor is moved to the top of the next raster column, the data in that raster column is sent, and the process continues until the complete bit-mapped image is sent. Such a strategy is shown by movement arrow 74 of FIG. 4. An effective implementation of this strategy preferably includes an efficient method of identifying raster columns.

Figure 5:
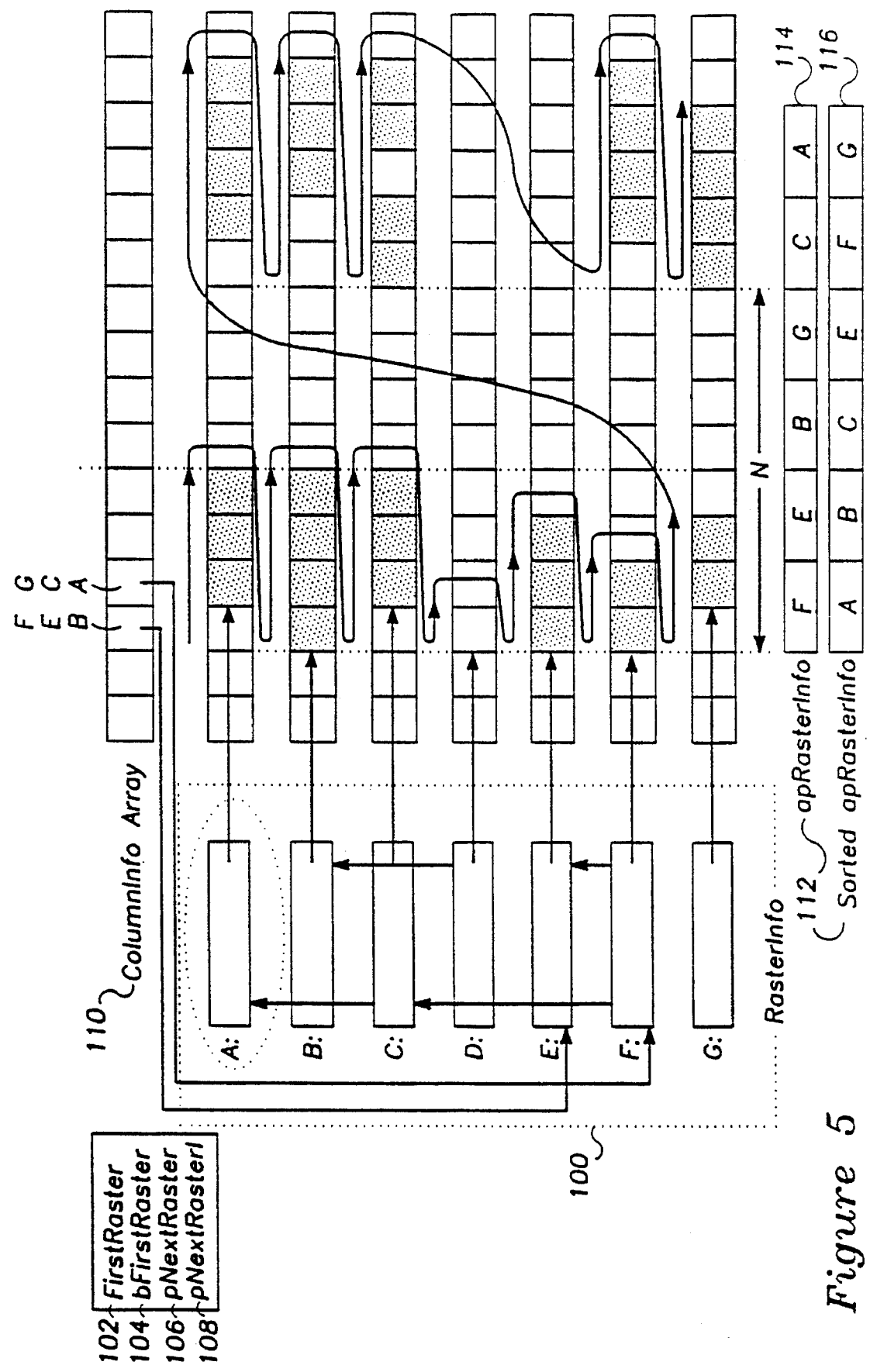
FIG. 5 illustrates a bit-mapped image and the data arrays used to recognize raster columns in accordance with a preferred embodiment of the present invention and the bit-mapped image.

The preferred embodiment illustrated herein recognizes raster columns within a bit-mapped image using three data arrays. These data arrays are illustrated in FIG. 5, together with a simplified bit-mapped image comprised of six rows. The first data array, called the RasterInfo Array 100, has an entry for each row of the bit-mapped image and each entry has four fields. The first field, pFirstRaster 102, stores the column address containing the leftmost HIGH image point within the unprocessed raster segment. The next field, called cbFirstRaster 104, contains the width of the raster column in the row being processed. The next field, called pNextRaster 106, points to the first HIGH value in the next unprocessed raster column in the row being processed. Finally the field pNextRasterInfo 108 is a linking field used to interconnect the various data elements of RasterInfo 100. The second data array, called the ColumnInfo array 110, contains an entry for each column in the bit-mapped image. The third array, called the apRasterInfo array 112, is used during the process of recognizing raster columns.

While the written description of these three arrays and their use is somewhat complex, it is to be understood that a computer searching a bit-mapped image according to the preferred methods is fast and efficient and is implementable using almost any computer language and is usable on almost any computer.

The initial values of the elements of RasterInfo array 100 are constructed by initially scanning each row from the left edge of the bit-mapped image looking for an unprocessed HIGH bit, and then continuing the scan until either a large gap is found, or the row ends. The minimum size of the gap which qualifies as "large" depends upon the particular application and the printer used. Since gaps determine the edges of the raster columns, in general small gaps should be ignored since it is quicker to send small gaps pel-by-pel than it is to construct many narrow columns. As each row is scanned, the column address of the leftmost unprocessed raster segment is stored in pFirstRaster 102 while the length of that raster segment is stored in cbFirstRaster 104. The beginning column of the next unprocessed raster segment is stored in pNextRaster 106.

As the RasterInfo array is constructed, the row number of each row is stored in the ColumnInfo array at the column address corresponding to the column containing the leftmost unprocessed HIGH data bit in each row. Some of the rows may lack HIGH data bits all together thereby denoting blank horizontal lines. In that case, those rows will not cause an entry into the ColumnInfo array. After all of the rows have been processed, the ColumnInfo array entries contain a sequence of row designators that designate the rows that have their leftmost unprocessed raster column HIGH data elements in that entry's address. This may be visualized by considering each ColumnInfo array entry as a stack containing the rows which have their first HIGH data bit in the column corresponding to that entry.

After all rows have been searched and the first HIGH data bit in each row of the raster column has been found, the ColumnInfo array is searched to find the first (leftmost) designator. The column corresponding to the leftmost ColumnInfo entry containing a row designator is identified as the left margin for the leftmost unprocessed raster column; For example, referring to FIG. 5, since the first two entries of the ColumnInfo array do not contain row designators but the third column does, column 3 is identified as the left margin. Note that in FIG. 5 that column 3 contains row designators for rows B, E, and F, each of which has a leftmost entry in column 3.

After the left edge is identified, it is used to control the positions of the left margin. The right margin is obtained based on the distance of the raster segment from the left margin. When the row-wise search of the bit-mapped image was performed, the length of the raster segment at each row of the raster column was determined and stored in cbFirstRaster 104. The preferred embodiment creates suitable printer commands, based on the left margin and length of each raster segment, for the printer being used and sends these commands to the printer to cause the printer to set its left and right margins to correspond to those identified the left and right edges of the raster column. Then, the bit-mapped image data within that raster column is sent to the printer as a continuous data stream.

In some preferred embodiments, the information within the ColumnInfo array is used to further speed up data transfer. According to such preferred embodiments, rows without HIGH data values in the raster column are identified. This preferably involves sorting the contents of the ColumnInfo array. One preferred method of doing this is by temporarily storing the contents of the ColumnInfo array within the apRasterInfo array. As shown in FIG. 5, the third entry of the ColumnInfo array contains a stacked listing of row designators for rows B, E, and F, and the fourth entry contains a stacked listing of row designators for rows A, C, and G. When the row designators are initially stored in the apRasterInfo array, they create the listing 114 shown in FIG. 5. The row designators preferably are then sorted, which results in the sorted apRasterInfo array containing the listing 116 illustrated in FIG. 5. Any of the raster rows, such as row D in FIG. 5, that did not contain a HIGH data value are not in the apRasterInfo array. However, all of the other RasterInfo addresses in the sorted apRasterInfo array are in sequential order by rows. If a raster row does not contain any HIGH data, detectable by it not being in the sorted apRasterInfo array, the computer sends printer movement commands to cause the printer cursor to jump to the far right margin, at which time it again automatically returns to the left margin, one raster row down. However, if a preselected number of adjacent raster rows do not contain bit-mapped image data, shown by a number of sequentially missing row designators in the sorted apRasterInfo array, the computer preferably sends a vertical movement command to cause the cursor to jump downward to the next row that contains HIGH bit-mapped image data.

After all the bit-mapped image data within the raster column is sent to the printer, as detected by the last row designator in the apRasterInfo array, the pNextRaster entries of the RasterInfo array are scanned to determine the next raster column. The left margin is then set to the beginning of the next raster column and the RasterInfo array is updated by another search of the bit-mapped image starting at the new raster column. The coordinates of the left margin and length of new raster column are then utilized as above and sent to the printer to adjust the margins in accordance with the raster column. The above sequence repeats until the last raster column has been sent to the printer, at which time the contents of the bit-mapped image have been sent to the printer.

It will be appreciated that, although specific embodiments of the invention have been described herein for purposes of illustration, various modifications may be made without departing from the spirit and scope of the invention. Accordingly, the invention is not limited except as by the appended claims.

I claim:

1. In a computer system having a computer and an output device, a method of transferring a bit-mapped image that is divisible into rows and columns from the computer to the output device, said output device having adjustable column margins, said adjustable margins including an adjustable left margin and an adjustable right margin, comprising the computer-system implemented steps of:

(a) identifying in the computer a first raster column and a second raster column within the bit-mapped image, said first raster column and said second raster column each containing a subset of less than all of the columns in a number of the rows in the bit-mapped image to be output on the output device, including a leftmost column and a rightmost column;

(b) determining with the computer and adjusting the adjustable left margin to bound the leftmost column in the first raster column and determining with the computer and adjusting the adjustable right margin to bound the rightmost column of the first raster column with the computer;

(c) sending image data for the first raster column from the computer, to the output device to be output on the output device between the adjustable left margin and the adjustable right margin;

(d) determining with the computer and adjusting the adjustable left margin to bound the leftmost column in the second raster column and determining with the computer and adjusting the adjustable right margin to bound the rightmost column of the second raster column with the computer; and (c) sending image data for the second raster column from the computer to the output device to be output on the output device between the adjustable left margin and the adjustable right margin.

2. A method as in claim 1 wherein step (b) includes sending commands to the output device appropriate to adjust the adjustable column margins.

3. In a computer system having a computer and a printer, a method of transferring and printing a bit-mapped image from the computer to the printer, said printer having adjustable column margins, including an adjustable left margin and an adjustable right margin, and resetting a cursor when the cursor reaches one of the adjustable margins, comprising the computer-system implemented steps of:

(a) identifying in the computer a first raster column and a second raster column within the bit-mapped image, said first raster column and said second raster column each containing a subset of less than all of the columns in a number of the rows in the bit-mapped image to be output on the output device, including a leftmost column and a rightmost column;

(b) determining and adjusting the adjustable left margin to bound the leftmost column in the first raster column and determining and adjusting the adjustable right margin to bound the rightmost column of the first raster column with the computer;

(c) sending image data for the first raster column from the computer to the printer to be output on the output device between the adjustable left margin and the adjustable right margin;

(d) printing the first raster column on the printer in accordance with the image data and the adjustable left and right margins;

(e) determining with the computer and adjusting the adjustable left margin to bound the leftmost column in the second raster column and determining with the computer and adjusting the adjustable right margin to bound the rightmost column of the second raster column with the computer;

(f) sending image data for the second raster column from the computer to the output device to be output on the output device between the adjustable left margin and the adjustable right margin; and (g) printing the second raster column on the printer in accordance with the image data and the adjustable left and right margins.

4. A method as in claim 3 wherein step (b) includes the step of sending commands to the printer appropriate to adjust the adjustable margins.

5. A system for transferring a bit-mapped image that includes rows and columns, said system comprising:

an output device having adjustable margins, including a left adjustable margin and a right adjustable margin, and receiving the bit-mapped image for outputting the bit-mapped image according to the adjustable margins; and a computer, operatively connected to said output device and comprising: means for recognizing raster columns in the bit-mapped image, each said raster column containing a subset of the less than all of columns in a number of rows in the bit-mapped image, means for determining left and right margins for the raster columns so that the raster columns are contained within the margins, end means for providing said output device with commands to adjust the left and right adjustable margins to the determined margins in sequence as the raster columns are to be printed.

6. A system according to claim 3 wherein:

said printer prints an image corresponding to each of the raster columns one at a time.

7. The method of claim 1, further comprising the step of selecting the bit-mapped image from within a larger second bit-mapped image.

8. The method of claim 3, further comprising the step of selecting the bit-mapped image from within a larger second bit-mapped image.

9. The system of claim 5 wherein the computer further comprises means for selecting the bit-mapped image from within a larger second bit-mapped image.

10. A method in a computer system for transferring a bit-mapped image organized in rows and columns to an output device having adjustable left and right margins, comprising the steps of, with the computer system;

identifying in the image a plurality of raster columns each comprising a span of columns of the image from a leftmost column of the raster column to a rightmost column of the raster column; and for each identified raster column in turn;
adjusting the left margin of the output device to coincide with the leftmost column of the raster column,
adjusting the right margin of the output device to coincide with the rightmost column of the raster column, and
sending to the output device the contents of the image between the leftmost and rightmost columns of the raster column, such that the output device receives the contents of the image occurring in each raster column while the left and right margins of the output device are adjusted to the leftmost and rightmost columns of the raster column.

11. The method of claim 10 wherein the image contains a pel for each intersection of a row and a column, each pel containing either a high or low dam value, and wherein the identifying step identifies raster columns that are separated from adjacent raster columns by one or more columns whose pels all contain low data values.

12. The method of claim 10, further comprising the step of, with the computer system, selecting the bit-mapped image from within a larger second bit-mapped image.

13. A computer-readable medium whose contents cause a computer program to transfer a bit-mapped image organized in rows and columns to an output device having adjustable left and right margins by performing the steps of;

identifying in the image a plurality of raster columns each comprising a span of columns of the image from a leftmost column of the raster column to a rightmost column of the raster column; and for each identified raster column in turn;
adjusting the left margin of the output device to coincide with the leftmost column of the raster column,
adjusting the right margin of the output device to coincide with the rightmost column of the raster column, and
sending to the output device the contents of the image between the leftmost and rightmost columns of the raster column, such that the output device receives the contents of the image occurring in each raster column while the left and right margins of the output device arc adjusted to the leftmost and rightmost columns of the raster column.

14. The computer-readable medium of claim 13 wherein the image contains a pel for each intersection of a row and a column, each pel containing either a high or low data value, and wherein the identifying step identifies raster columns that are separated from adjacent raster columns by one or more columns whose pels all contain low data values.

* * * * *

UNITED STATES PATENT AND TRADEMARK OFFICE
CERTIFICATE OF CORRECTION

PATENT NO. : 5,553,205
DATED : September 3, 1996
INVENTOR(S) : Ronald C. Murray

It is certified that error appears in the above-indentified patent and that said Letters Patent is hereby corrected as shown below:

In column 8, claim 1, line 5, please delete "(c)" and insert therefore --(e)--.

In column 9, claim 5, line 3, please delete "end" and insert therefor --and--.

In column 9, claim 10, line 22, please delete ";" and insert therefor --:--.

In column 9, claim 10, line 27, please delete ";" and insert therefor --:--.

In column 10, claim 11, line 3, please delete "dam" and insert therefor --data--.

In column 10, claim 13, line 14, please delete ";" and insert therefor --:--.

In column 10, claim 13, line 19, please delete ";" and insert therefor --:--.

In column 10, claim 13, line 30, please delete "arc" and insert therefor --are--.

Signed and Sealed this

Twenty-fourth Day of December, 1996

Attest:

BRUCE LEHMAN

*Attesting Officer*     *Commissioner of Patents and Trademarks*